(12) United States Patent
Kesselman et al.

(10) Patent No.: US 8,681,707 B2
(45) Date of Patent: Mar. 25, 2014

(54) CHANNEL SELECTION TECHNIQUES FOR WIRELESS NETWORKS

(75) Inventors: Alex Kesselman, Haifa (IL); Guoqing Li, Hillsboro, OR (US); Ali Sadri, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 1017 days.

(21) Appl. No.: 11/948,492

(22) Filed: Nov. 30, 2007

(65) Prior Publication Data
US 2008/0198801 A1 Aug. 21, 2008

Related U.S. Application Data

(60) Provisional application No. 60/890,991, filed on Feb. 21, 2007.

(51) Int. Cl.
*H04H 20/67* (2008.01)
*H04B 7/185* (2006.01)
*H04B 1/00* (2006.01)
*H04B 15/00* (2006.01)
*H04M 11/00* (2006.01)

(52) U.S. Cl.
USPC ............. 370/329; 370/318; 375/132; 455/62; 455/403

(58) Field of Classification Search
USPC .................... 370/318, 329; 455/403; 375/132
See application file for complete search history.

(56) References Cited

U.S. PATENT DOCUMENTS

| | | | |
|---|---|---|---|
| 6,795,419 B2 | 9/2004 | Parantainen et al. | |
| 6,859,486 B1 * | 2/2005 | Mohebbi | 375/132 |
| 7,149,519 B2 | 12/2006 | Backes et al. | |
| 2004/0029591 A1 | 2/2004 | Chapman et al. | |
| 2006/0092870 A1 * | 5/2006 | Kondou et al. | 370/318 |
| 2006/0292988 A1 * | 12/2006 | Yuen et al. | 455/62 |
| 2007/0270121 A1 * | 11/2007 | Shao et al. | 455/403 |

FOREIGN PATENT DOCUMENTS

| | | |
|---|---|---|
| KR | 20000032939 | 6/2000 |
| KR | 20010105921 | 11/2001 |
| WO | 2004019647 | 3/2004 |
| WO | 2008103582 A1 | 8/2008 |

* cited by examiner

*Primary Examiner* — Ian N Moore
*Assistant Examiner* — Kiet Tang
(74) *Attorney, Agent, or Firm* — Kacvinsky Daisak Bluni PLLC (57) ABSTRACT

Channel selection techniques for a wireless network are described. An apparatus may comprise a device to communicate information over a common wireless communication link. The device may include a channel selection module to select a channel pair comprising a high rate physical channel and a low rate physical channel based on energy measurements for the channels. Other embodiments are described and claimed.

16 Claims, 6 Drawing Sheets

CHANNEL SELECTION TECHNIQUES FOR WIRELESS NETWORKS

CROSS-REFERENCE TO RELATED APPLICATION

This application claims priority to U.S. Provisional Application Ser. No. 60/890,991 entitled "CHANNEL SELECTION TECHNIQUES FOR WIRELESS NETWORKS" filed on Feb. 21, 2007.

BACKGROUND

Wireless communication systems communicate information over a shared wireless communication medium such as one or more portions of the radio-frequency (RF) spectrum. Demand for use of the limited RF spectrum is high, therefore creating a constant need to improve bandwidth efficiency and utilization. In many cases, wireless communication systems typically divide the available RF spectrum into sub-portions so that multiple wireless devices can communicate at the same time. Efficient assignment and use of the sub-portions may increase the number of wireless devices that can simultaneously use the available RF spectrum, thereby leading to improved bandwidth efficiency.

DETAILED DESCRIPTION

Various embodiments may be generally directed to spatial reuse techniques for wireless communication systems. Some embodiments may be particularly directed to a channel selection technique for selecting one or more communication channels from a common or shared wireless media, such as one or more bands of RF spectrum. In one embodiment, for example, a novel and unique channel selection algorithm may be implemented in a wireless device to select channel pairs suitable for wireless communication between two or more devices over a wireless network, such as a wireless video area network (WVAN) or wireless personal area network (WPAN). Such networks are sometimes referred to as "piconets" due to their limited transmission ranges and participating devices.

In one embodiment, for example, a first device may be arranged to communicate information over a common wireless communication link to a second device. The first device or second device may include a channel selection module to select a channel pair to communicate media information between the two devices. A channel pair may refer to two or more communication channels suitable for use with a given set of devices. One example of media information may include High Definition Television (HDTV) content and signals. The channel pairs may each include a first channel to communicate information from the first device to the second device, and a second channel to communicate information from the second device to the first device. In one embodiment, for example, the channels may have different transmission envelopes or characteristics. For example, the first channel may be a directional channel and the second channel may be an omni-directional channel. A directional channel may refer to a channel used for directional transmissions. An omni-directional channel may refer to a channel used for omni-directional transmissions. In one embodiment, for example, the channels may operate at different transmission speeds. For example, the first channel may comprise a high rate physical (HRP) channel, and the second channel may comprise a low rate physical (LRP) channel. Alternatively, both channels in a channel pair may comprise HRP channels or LRP channels, as desired for a given implementation. The embodiments are not limited in this context.

In various embodiments, the channel selection module may be arranged to select channel pairs to reduce spatial interference between adjacent or nearby devices, and to promote efficient spatial reuse for a wireless communication system. In some cases, one or both channels for a channel pair for a given piconet established between two or more devices may potentially create interference with other devices within transmission range of a transmitting device using a given channel. For example, the LRP channel may be an omni-directional channel, thereby creating a transmission envelope in all directions around the transmitting device which may interfere with other HRP and/or LRP transmissions. As a result, nearby devices typically need to select different LRP channels to reduce such interference. Since there is limited RF spectrum assigned to a given communications system, however, the selection of different LRP channels may be inefficient and quickly consume the available spectrum, thereby reducing the number of devices that can communicate at the same time. Consequently, the channel selection module attempts to select channel pairs that reduce interference to surrounding devices while also efficiently using the available spectrum to increase the number of devices capable of simultaneously using the available spectrum.

Figure 1:
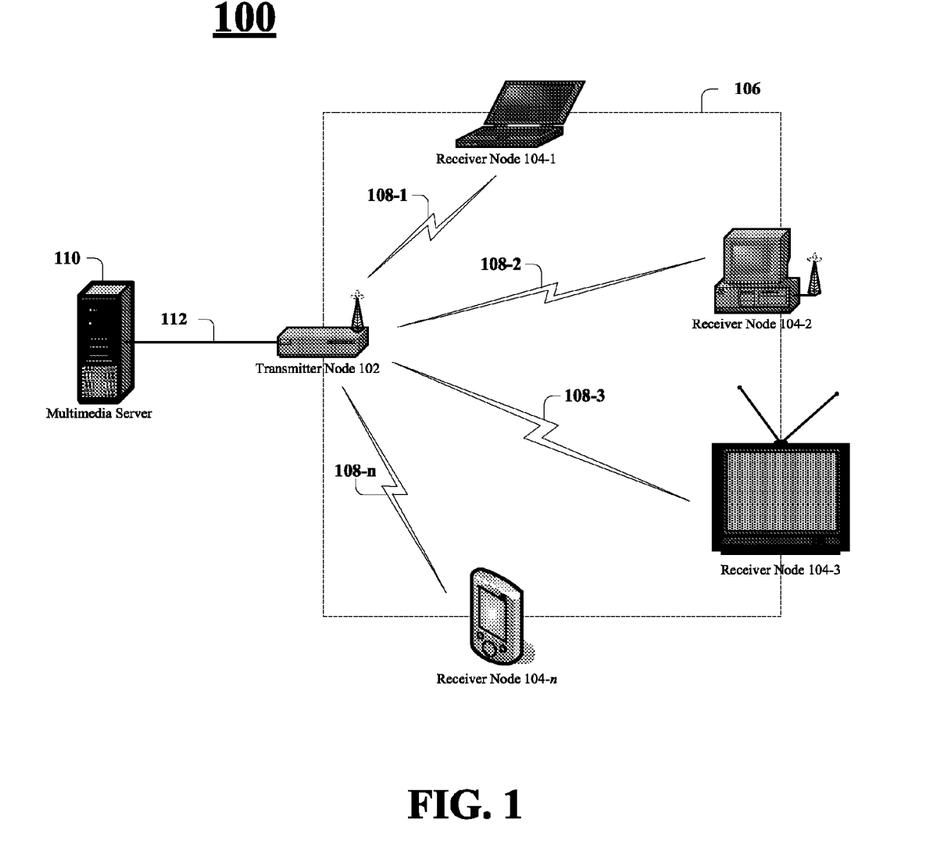
FIG. 1 illustrates one embodiment of a communications system.

FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The communications system 100 may communicate information in accordance with one or more standards as promulgated by a standards organization. In one embodiment, for example, various devices comprising part of the communications system 100 may be arranged to operate in accordance with one or more of the WirelessHD™ specifications, standards or variants, such as the WirelessHD Specification, Revision 0.6d1, Jan. 16, 2007, and its progeny as promulgated by WirelessHD, LLC (collectively referred to as the "WirelessHD Specification"). The WirelessHD Specification defines a next generation wireless digital network interface for consumer electronic products. Specifically, the WirelessHD Specification enables wireless connectivity for streaming high-definition content between source devices and high-definition displays. The WirelessHD Specification defines a wireless protocol that enables the creation of a WVAN. In a current instantiation of the WirelessHD Specification, the MAC and PHY are defined to support the wireless delivery of uncompressed high definition audio and video at formats up to 1080p at 60 Hertz (Hz) with 24 bit color at a range that is typically at least 10 meters. In addition, the delivery of compressed audio/visual (AV) streams and data is also supported at a similar range. An adaptation sub-layer enables network and service set up by supporting authentication, advanced device and connection control.

Although some embodiments may be described with reference to the WirelessHD Specification by way of example, it may be appreciated that the techniques described herein may also be implemented for other wireless standards as promulgated by other standards organizations as well, such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the communications system 100 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, and variants); IEEE 802.16 standards for WMAN including the IEEE 802.16 standard such as 802.16-2004, 802.16.2-2004, 802.16e-2005, 802.16f, and variants; and other wireless networking standards. The embodiments are not limited in this context.

The communications system 100 may communicate, manage, or process information in accordance with one or more protocols. A protocol may comprise a set of predefined rules or instructions for managing communication among nodes. In various embodiments, for example, the communications system 100 may employ one or more protocols such as a medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The communications system 100 also may be arranged to operate in accordance with standards and/or protocols for media processing. Examples of media processing standards include, without limitation, the High Definition Television (HDTV) standards as defined by the ITU Radiocommunication Sector (ITU-R), such as the Recommendation BT.709-5, Parameter Values for the HDTV Standards For Production and International Programme Exchange, published April 2002, the Digital Video Broadcasting Terrestrial (DVB-T) broadcasting standard, the ITU/IEC H.263 standard, Video Coding for Low Bitrate Communication, ITU-T Recommendation H.263v3, published November 2000 and/or the ITU/IEC H.264 standard, Video Coding for Very Low Bit Rate Communication, ITU-T Recommendation H.264, published May 2003, Motion Picture Experts Group (MPEG) standards (e.g., MPEG-1, MPEG-2, MPEG-4), and/or High performance radio Local Area Network (HiperLAN) standards. Examples of media processing protocols include, without limitation, Session Description Protocol (SDP), Real Time Streaming Protocol (RTSP), Real-time Transport Protocol (RTP), Synchronized Multimedia Integration Language (SMIL) protocol, and/or Internet Streaming Media Alliance (ISMA) protocol. The embodiments are not limited in this context.

As shown in FIG. 1, the communications system 100 may comprise a transmitter node 102 coupled to a plurality of receiver nodes 104-1-$n$, where n may represent any positive integer value. In various embodiments, the transmitter node 102 and the plurality of receiver nodes 104-1-$n$ may be implemented as various types of wireless devices. Examples of wireless devices may include, without limitation, a coordinator, a station, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth. In such embodiments, the transmitter node 102 and the receiver nodes 104-1-$n$ may comprise one more wireless interfaces and/or components for wireless communication such as one or more transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

In various embodiments, the transmitter node 102 and the receiver nodes 104-1-$n$ may comprise or form part of a wireless network 106. In one embodiment, for example, the wireless network 106 may comprise a WVAN as defined by the WirelessHD Specification. In the context of a WVAN, both nodes 102, 104 may be implemented as WirelessHD compliant devices. In a WVAN, the transmitter node 102 may be communicatively coupled to one or more receiver nodes 104-1-$n$. In accordance with the WirelessHD Specification and nomenclature, one or both of the nodes 102, 104 may be implemented as a coordinator or a station. A coordinator is normally, but not always, a device that is a sink for media information (e.g., audio or video data). The coordinator typically includes a display, and in some cases a media storage device such as a personal video recorder (PVR), media server, or STB. A station may comprise a device that either has media information that it can source or sink, potentially at the same time.

Although some embodiments may be described with the wireless network 106 implemented as a WVAN network for purposes of illustration, and not limitation, it can be appreciated that the embodiments are not limited in this context. For example, the wireless network 106 may comprise or be implemented as various types of wireless networks and associated protocols suitable for a WPAN, a Wireless Metropolitan Area Network, a Wireless Wide Area Network (WWAN), a Broadband Wireless Access (BWA) network, a radio network, a television network, a satellite network such as a direct broadcast satellite (DBS) network, and/or any other wireless communications network configured to operate in accordance with the described embodiments.

As shown in the embodiment of FIG. 1, the transmitter node 102 may be coupled to receiver nodes 104-1-$n$ by wireless communication links 108-$n$. A particular wireless communication link (e.g., wireless communication link 108-1) may be arranged to establish one or more common or dedicated connections between the transmitter node 102 and a particular receiver node (e.g., receiver node 104-1). In various embodiments, a particular wireless communication link (e.g., wireless communication link 108-1) may include multiple virtual channels, with each of the virtual channels comprising a point-to-point logical connection from the transmitter node 102 to a particular receiver node (e.g., receiver node 104-1). In various implementations, multiple virtual channels may share a physical link, with each virtual channel comprising dedicated resources or bandwidth of the physical link.

In various embodiments, the nodes 102, 104 may communicate using a physical layer component (PHY), such as a high-rate PHY (HRP). In one embodiment, for example, the HRP supports multi-Gb/s throughput at a distance of approximately 10 meters through adaptive antenna technology. Because of this, the HRP is highly directional and is typically used for only unicast connections. The HRP is optimized for the delivery of uncompressed high-definition video, although other data can be communicated using the HRP. To support multiple video resolutions, the HRP has more than one data rate defined. The HRP carries isochronous data such as audio and video, asynchronous data, MAC commands, antenna beam forming information, and higher layer control data for A/V devices.

In various embodiments, the nodes 102, 104 may also communicate using a low-rate PHY (LRP). The LRP is a multi-Mb/s bidirectional link that also provides a range of approximately 10 meters. Multiple data rates are defined for the LRP, with the lower data rates having near omni-directional coverage while the highest data rates are directional. Because the LRP has near omni-directional modes, it can be used for both unicast and broadcast connections. Furthermore, because all stations support the LRP, it can be used for station-to-station links. The LRP supports multiple data rates, including directional modes, and is used to carry low-rate isochronous data such as audio, low-rate asynchronous data, MAC commands including the beacon, acknowledgements for HRP packets, antenna beam forming information, capabilities information, and higher layer control data for A/V devices.

The HRP and LRP operate in overlapping frequency bands and so they are coordinated by the MAC. The media access scheme may include a time division multiple access (TDMA) format, a frequency division multiple access (FDMA) format, a TDMA/FDMA format, a code division multiple access (CDMA), a wide-band CDMA (WCDMA) format, an orthogonal frequency division multiple access (OFDMA) format, and so forth. The embodiments are not limited in this context.

The WVAN typically supports two types of devices, such as a coordinator and a station. The coordinator controls the timing in the piconet, keeps track of the members of the WVAN, is able to transmit and receive using the LRP, may be able to transmit data using the HRP, and may be able to receive data using the HRP. A station is able to transmit and receive using the LRP, may initiate stream connections, may be able to transmit data using the HRP, and may be able to receive data using the HRP. A station may be capable of acting as a coordinator in the WVAN. Such a station is referred to as being coordinator capable.

In addition to the two MAC personalities of coordinator and station, each device in the WVAN will have one of four different PHY capabilities as shown in Table 1 as follows:

TABLE 1

| PHY | Description |
| --- | --- |
| HR0 | A device that is not able to either receive or transmit using the HRP |
| HRRX | A device that is able to receive in the HRP, but is not able to transmit using the HRP |
| HRTX | A device that is able to transmit in the HRP, but is not able to receive using the HRP |
| HRTR | A device that is able to both transmit and receive using the HRP |

All compliant WirelessHD devices are able to transmit and receive using the LRP. Both the HRP and LRP may provide multiple data rates, as specified in the WirelessHD Specification.

In various embodiments, the transmitter node 102 and the receiver nodes 104-1-$n$ may be arranged to communicate various types of media information in multiple communication frames. The various types of media information may include image information, audio information, video information, AV information, and/or other data provided from the media source 108. In various embodiments, the information may be associated with one or more images, image files, image groups, pictures, digital photographs, music file, sound files, voice information, videos, video clips, video files, video sequences, video feeds, video streams, movies, broadcast programming, television signals, web pages, user interfaces, graphics, textual information (e.g., encryption keys, serial numbers, e-mail messages, text messages, instant messages, contact lists, telephone numbers, task lists, calendar entries, hyperlinks), numerical information, alphanumeric information, character symbols, and so forth. The information also may include command information, control information, routing information, processing information, system file information, system library information, software (e.g., operating system software, file system software, application software, game software), firmware, an application programming interface (API), a program, an applet, a subroutine, an instruction set, an instruction, computing code, logic, words, values, symbols, and so forth.

The transmitter node 102 may be arranged to receive media content from a media source node 110 to be unicast and/or multicast to one or more of the receiver nodes 104-1-$n$. In various embodiments, the transmitter node 102 may be arranged to receive media content from the source node 110. The media source node 110 generally may comprise any media source capable of delivering static or dynamic media content to the transmitter node 102. In one embodiment, for example, the media source node 110 may comprise a multimedia server arranged to provide broadcast or streaming media content to the transmitter node 102. In some implementations, the media source node 110 may form part of a media distribution system (DS) or broadcast system such as an over-the-air (OTA) broadcast system, a radio broadcast system, a television broadcast system, a satellite broadcast system, and so forth. In some implementations, the media source node 110 may be arranged to deliver media content pre-recorded and stored in various formats for use by a device such as a Digital Versatile Disk (DVD) device, a Video Home System (VHS) device, a digital VHS device, a digital camera, video camera, a portable media player, a gaming device, and so forth.

As shown in the embodiment of FIG. 1, for example, the transmitter node 102 may be coupled to the media source node 110 through a communication medium 112. The communication medium 112 generally may comprise any medium capable of carrying information signals such as a wired communication link, wireless communication link, or a combination of both, as desired for a given implementation. In various embodiments, the communication medium 112 may comprise a wired communication link implemented as a wired Ethernet and/or P2P connection, for example. In such embodiments, information may be communicated over the communication medium 112 in accordance with the information IEEE 802.3, and the transmitter node 102 may receive media content from the media source node 110 substantially loss-free.

Although some embodiments may be described with the communication medium 112 implemented as a wired Ethernet and/or P2P connection for purposes of illustration, and not limitation, it can be appreciated that the embodiments are not limited in this context. For example, the communication medium 112 between the transmitter node 102 and the source node 110 may comprise various types of wired and/or wireless communication media and, in some cases, may traverse one or more networks between such devices.

The transmitter node 102 may be arranged to buffer media content and to parse or fragment the media content into communication frames for unicast or multicast transmission to the receiver nodes 104-1-$n$. In some implementations, the transmitter node 102 may be arranged to parse or fragment the received media content as it is read into a buffer. In some embodiments, the media content provided to the transmitter node 102 may be delivered as one or more media frames. Each media frame may comprise a discrete data set having a fixed or varying length, and may be represented in terms of bits or bytes such as 16 kilobytes (kB), for example. It can be appreciated that the described embodiments are applicable to various types of communication content or formats, such as frames, packets, fragments, cells, units, and so forth.

In various embodiments, the transmitter node 102 may be arranged to create a sequence of media frames to be broadcast over one or more of the wireless communication links 108-1-$n$. Each media frame may comprise a discrete data set having fixed or varying lengths, and may be represented in terms of bits or bytes. While multicasting, each media frame may contain a destination address comprising a group address corresponding to multiple intended recipients, such as receiver nodes 104-1-$n$. In some embodiments, the destination address may refer to all receiver nodes 104-1-$n$ within the wireless network 106.

Figure 2:
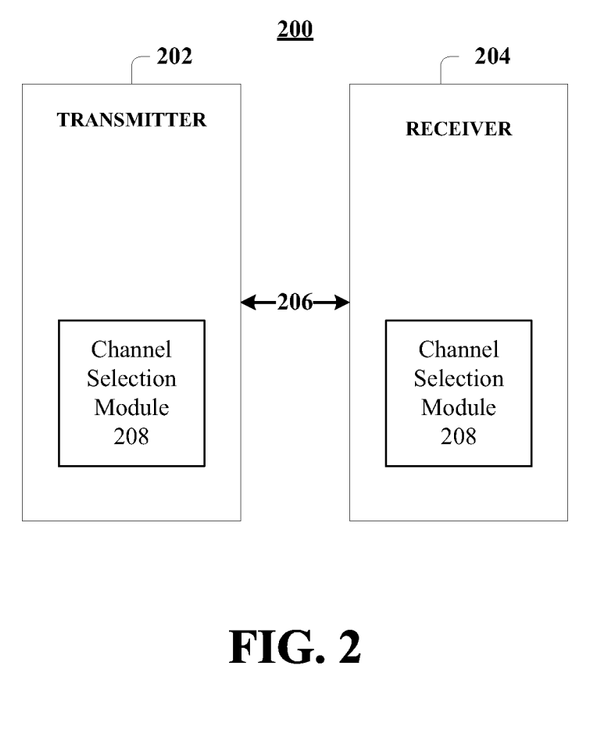
FIG. 2 illustrates one embodiment of a wireless network.

FIG. 2 illustrates a block diagram of one embodiment of a wireless network 200. For ease of illustration, and not limitation, the wireless network 200 depicts a limited number of nodes by way of example. It can be appreciated that more nodes may be employed for a given implementation.

As shown, the wireless network 200 may comprise a transmitter node 202 coupled to a receiver node 204. In various embodiments, the wireless communications system 200 may comprise or be implemented by one or more elements of the communications system 100 of FIG. 1, such as wireless network 100, transmitter node 102, and receiver nodes 104-1-$n$. The embodiments are not limited in this context.

In one embodiment, for example, the transmitter node 202 and the receiver node 204 may be implemented as WirelessHD compliant devices, and the wireless network 200 may be implemented as a WVAN network. In such an embodiment, the wireless network 200 may communicate information in accordance with the WirelessHD Specification and associated techniques, and the transmitter node 202 may comprise a WirelessHD compliant device communicatively coupled to the receiver node 204 comprising another WirelessHD compliant device. In various implementations, the wireless network 200 may support a unicast and/or multicast communication environment for distributing media content by unicasting and/or multicasting from the transmitter node 202 to the receiver node 204. Typically, the transmitter node 202 will utilize unicast or multicast techniques based upon the type of channel being used. For example, the transmitter node 202 will utilize unicast techniques when using a HRP channel, and multicast techniques when using a LRP channel. The embodiments are not limited in this context.

In one embodiment, for example, the transmitter node 202 and the receiver node 204 each may include the capability to establish one or more wireless communications channels 206. In various embodiments, the communications channel 206 may be implemented at the MAC layer of the communication protocol stack within a transceiver and/or wireless communication chipset of a wireless device.

Figure 3:
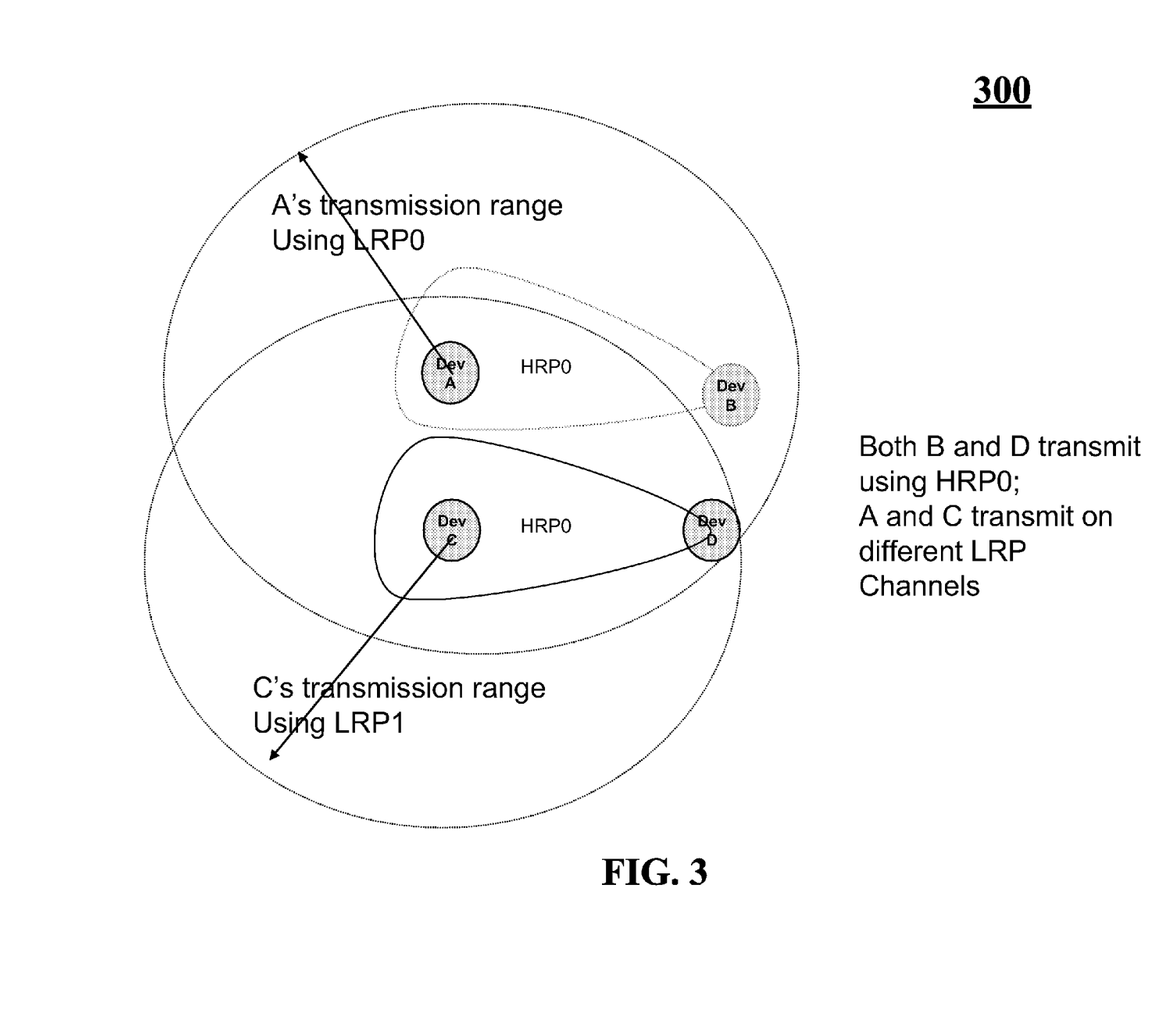
FIG. 3 illustrates one embodiment of transmission patterns.

FIG. 3 illustrates one embodiment of spatial reuse diagram for the wireless communication system 100. As previously described, there may be a multiple HRP channels, each of which encompasses or overlaps one or more LRP channels. HRP channels are intended for directional transmissions, while LRP channels are designed for omni-directional or directional transmissions. In order to communicate information between devices, one of the devices selects a channel pair comprising both a HRP channel and a LRP channel for its wireless communication.

In some cases, however, the channel pairs selected for a given set of devices may create interference with other devices that are nearby, adjacent or proximate to the communicating devices. As shown in FIG. 3, for example, a device B may communicate with a device A using a HRP channel such as HRP0. Similarly, device D may communicate with device C using a HRP channel such as HRP0. Since the HRP channel used by device pair A, B and device pair C, D are directional channels, the transmission envelopes create little or no interference between adjacent devices. Consequently, the directional characteristic of the HRP channels allow the spatial reuse of HRP0, which effectively increases channel capacity for the system 100. By way of contrast, on the return channel, device A may communicate with device B using a LRP channel such as LRP0, and device C may communicate with device D using a LRP channel such as LRP1. Since the LRP channels used by device pair A, B and device pair C, D are omni-directional channels, however, the transmission envelope created by device C potentially interferes with the reception by device A, and vice-versa. As a result, device pair A, B and device pair C, D are forced to use different LRP channels, thereby decreasing the number of channels available to the system relative to the channel allocations for the HRP channels.

Various embodiments attempt to solve these and other problems by using a novel channel pair selection algorithm that selects a channel pair for two or more WirelessHD compliant devices. To accomplish this, the transmitter node 202 and/or the receiver node 204 may include a channel selection module 208. The channel selection module 208 may implement the channel pair selection algorithm to select a channel pair that provides efficient spatial reuse for the available RF spectrum, while reducing interference between nearby devices.

For example, assume a transmitter node 202 and a receiver node 204 are implemented as a station and coordinator, respectively, in a WVAN for a WirelessHD system. The transmitter node 202 may receive media information from a media source such as multimedia server 110 destined for transmission to the receiver node 204. Prior to transmitting the media information, a piconet needs to be established between the transmitter node 202 and the receiver node 204. To establish the piconet, a channel selection module 208 for one of the nodes 202, 204 may initiate a scanning process for available communication channels. In one embodiment, for example, this is typically performed by the transmitter node 202. In some cases, however, the receiver node 204 may also perform channel selection operations to assist the transmitter node 202 or in lieu of the transmitter node 202. After performing the scanning process, the transmitter node 202 either joins an existing wireless network or creates a new one. The channel selection module 208 may implement a channel selection algorithm to select an available HRP/LRP channel pair to create a new wireless network. The channel selection module 208 allows spatial reuse of a HRP channel using multiple LRP channels.

Figure 4:
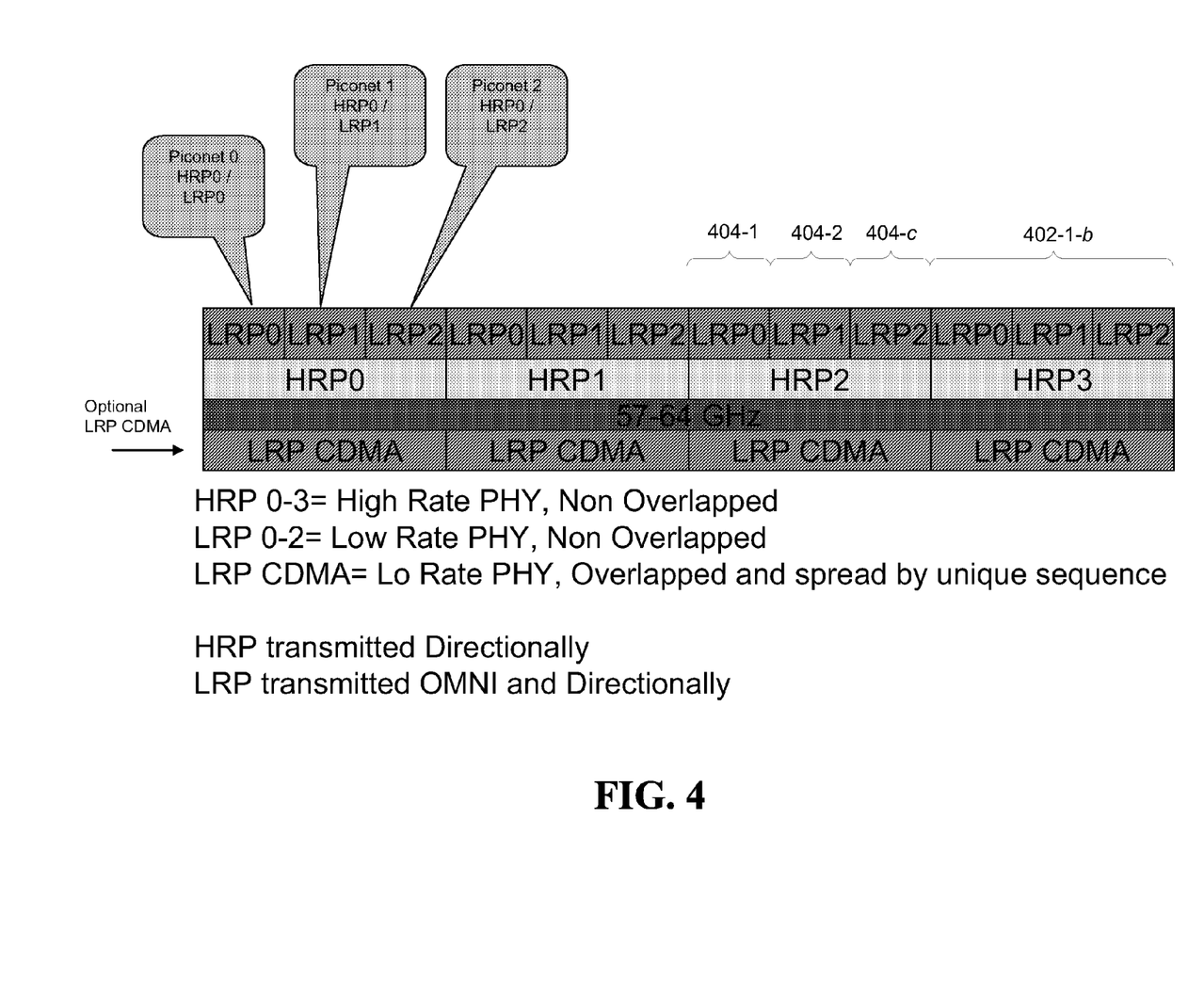
FIG. 4 illustrates one embodiment of a spectrum allocation.

FIG. 4 illustrates one embodiment of a spectrum allocation. In various embodiments, a unique spectrum allocation technique may be used to facilitate the selection of channel pairs. As shown in FIG. 4, the assigned RF spectrum for the communications system 100 may be divided into blocks, portions or sub-bands 402-1-$b$. For example, if the assigned RF spectrum was in the 57-64 Gigahertz (GHz) range, then blocks 402-1-$b$ may each comprise approximately 2 GHz. Each block 402-1-$b$ may be further sub-divided into sub-blocks 404-1-$c$.

In various embodiments, each block 402-1-$b$ may be used for a HRP channel, as represented by HRP channels HRP0-3. In addition, the sub-blocks 404-1-$c$ for each block 402-1-$b$ may be used for a LRP channel, as represented by LRP channels LRP0-2. Using this allocation scheme, each block 402-1-$b$ may potentially represent multiple channel pairs for different networks created between two or more devices. As shown in FIG. 4, for example, a block 402-1-$b$ may provide at least 3 channel pairs, such as HRP0/LRP0 for a piconet 0, HRP0/LRP1 for a piconet 1, an HRP0/LRP2 for a piconet 3. With this spectrum allocation technique, the channel selection module 208 for nodes 202, 204 may quickly scan the available spectrum for candidate channel pairs for a new network between the nodes 202, 204. Further, the spectrum allocation technique arranges the candidate channel pairs in a manner to reduce potential interference with other channel pairs assigned to the communication system 100. The operations for the channel selection module 208 may be described in more detail with reference to FIG. 5.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 5:
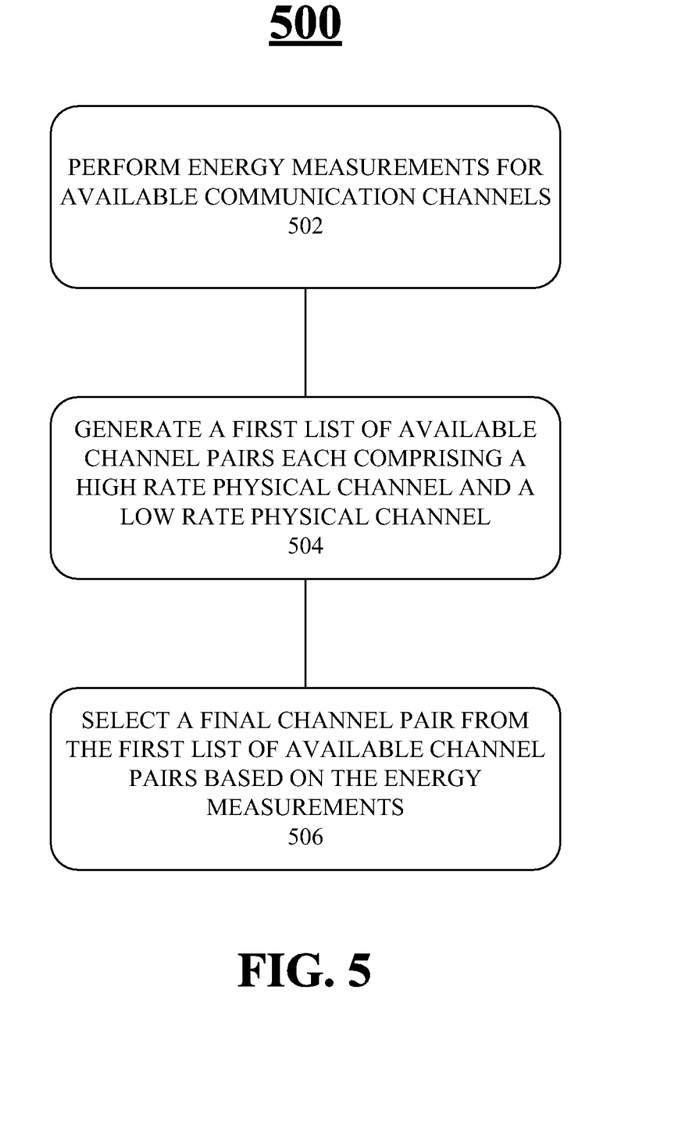
FIG. 5 illustrates one embodiment of a logic flow.

FIG. 5 illustrates one embodiment of a logic flow 500 for selecting a channel pair to form a new wireless network between two or more devices. In various embodiments, the logic flow 500 may be performed by various systems, nodes, and/or modules and may be implemented as hardware, software, and/or any combination thereof, as desired for a given set of design parameters or performance constraints. For example, the logic flow 500 may be implemented by a logic device (e.g., transmitter node, receiver node) and/or logic comprising instructions, data, and/or code to be executed by a logic device. For purposes of illustration, and not limitation, the logic flow 500 is described with reference to FIG. 1. The embodiments are not limited in this context.

In one embodiment, for example, the logic flow 500 may perform energy measurements for available communication channels at block 502. The logic flow 500 may generate a first list of available channel pairs each comprising a high rate physical channel and a low rate physical channel at block 504. The logic flow 500 may select a final channel pair from the first list of available channel pairs based on the energy measurements at block 506.

By way of example, assume the transmitter node 102 communicates HDTV media content to a receiver node, such as receiver node 104-3 comprising a HDTV display, via wireless communication channel 108-3. Prior to communicating the media information, the channel selection module 208 may scan all LRP and all HRP channels in order to perform energy detection and measurement. The channel selection module 208 may find all available HRP/LRP channel pairs for which the detected energy for one or both of the HRP and LRP channels is below a corresponding set of defined HRP and LRP interference threshold values, respectively. The defined HRP and LRP interference threshold values may be any values defined in accordance with a desired set of performance or design constraints. The channel selection module 208 may then select the most appropriate HRP/LRP pair based on the detected energy measurements for these channels.

In one embodiment, for example, the channel selection module 208 may be arranged to select the most appropriate HRP/LRP pair by focusing on the HRP channel first. In one embodiment, for example, the channel selection module 208 may compare energy measurements for the high rate physical channels for channel pairs from the first list with a first defined energy value, such as an HRP interference threshold value, for example. The channel selection module 208 may generate a second list of channel pairs having high rate physical channels with energy measurements below the first defined energy value based on the comparison. The channel selection module 208 may compare the energy measurements for the low rate physical channels for channel pairs from the second list with a second defined energy value, such as an LRP interference threshold value. The channel selection module 208 may select the final channel pair from the second list having a low rate physical channel with a lowest energy measurement.

In one embodiment, for example, the channel selection module 208 may be arranged to select the most appropriate HRP/LRP pair by focusing on the LRP channel first. For example, the channel selection module 208 may compare energy measurements for the low rate physical channels for channel pairs from the first list with a first defined energy value, such as an LRP interference threshold value. The channel selection module 208 may generate a second list of channel pairs having low rate physical channels with energy measurements below the first defined energy value based on the comparison. The channel selection module 208 may compare energy measurements for the high rate physical channels for channel pairs from the second list with a second defined energy value, such as an HRP interference threshold value. The channel selection module 208 may select the final channel pair from the second list having a high rate physical channel with a lowest energy measurement.

By way of example, the channel selection module 208 of transmitter node 102 may use various selection criteria to select a channel pair. For example, the channel selection module 208 may be arranged to select a channel pair by first choosing the pairs with the least HRP interference, and then selecting the pair among them with the least LRP interference. Alternatively, the channel selection module 208 may be arranged to select a channel pair by first choosing the pairs with the least LRP interference, and then selecting the pair among them with the least HRP interference.

Another unique selection criterion used by the channel selection module 208 may include utilizing a weighted interference function to emphasize or de-emphasize the HRP channel or the LRP channel for a given implementation. In one embodiment, for example, the channel selection module 208 may calculate a weighted interference function that combines energy measurements for a channel pair from the first list to create a channel pair energy measurement. The channel selection module 208 may select a final channel pair based on the channel pair energy measurements. By way of example, the channel selection module 208 may calculate a weighted interference function that will combine measured interferences of both the HRP and LRP channels together. The channel selection module 208 may then select the channel pair that has the smallest weight, for example.

To further decrease potential interference to surrounding devices, the transmitter node 102 may be arranged to communicate information via the LRP channel using CDMA techniques. Spreading the information using a unique spreading code may further decrease the possibility of creating interference with adjacent channels and/or devices, thereby effectively increasing spatial reuse of the common or shared wireless media. In addition to CDMA, any suitable media access technique may be used as previously described (e.g., TDMA, FDMA, TDMA/FDMA, WCDMA, and so forth) to further provide channel separation and increase channel reuse.

Figure 6:
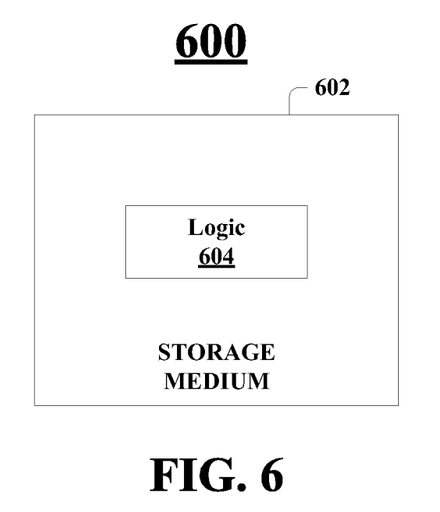
FIG. 6 illustrates one embodiment of an article of manufacture.

FIG. 6 illustrates one embodiment of an article of manufacture 600. As shown, the article 600 may comprise a storage medium 602 to store logic 604 for selecting a channel pair to form a new wireless network between two or more devices. For example, logic 604 may be used to implement the channel selection module 208, as well as other aspects of the transmitter node (102, 202) and/or the receiver nodes (**104-1-*n*, 204). In various embodiments, the article 600** may be implemented by various systems, nodes, and/or modules.

The article 600 and/or machine-readable storage medium 602 may include one or more types of computer-readable storage media capable of storing data, including volatile memory or, non-volatile memory, removable or non-removable memory, erasable or non-erasable memory, writeable or re-writeable memory, and so forth. Examples of a machine-readable storage medium may include, without limitation, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information. Moreover, any media involved with downloading or transferring a computer program from a remote computer to a requesting computer carried by data signals embodied in a carrier wave or other propagation medium through a communication link (e.g., a modem, radio or network connection) is considered computer-readable storage media.

The article 600 and/or machine-readable medium 602 may store logic 604 comprising instructions, data, and/or code that, if executed by a machine, may cause the machine to perform a method and/or operations in accordance with the described embodiments. Such a machine may include, for example, any suitable processing platform, computing platform, computing device, processing device, computing system, processing system, computer, processor, or the like, and may be implemented using any suitable combination of hardware and/or software.

The logic 604 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context. When implemented the logic 604 is implemented as software, the software may be executed by any suitable processor and memory unit.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a first device to communicate information over a common wireless communication link, the first device to include a channel selection module operative to:
perform energy measurements for available communication channels;
generate a first list of available channel pairs each comprising a high rate physical channel and a low rate physical channel;
calculate a weighted interference function for each channel pair in the first list of available channel pairs, the weighted interference function for each channel pair combining measured interferences of the high rate physical channel and the low rate physical channel of that channel pair to create a channel pair energy measurement for that channel pair that emphasizes or de-emphasizes the high rate physical channel or the low rate physical channel of that channel pair;
generate a second list of channel pairs based on the first list of available channel pairs and on one or both of a high rate physical channel interference threshold value and a low rate physical channel interference threshold value; and
select a final channel pair from the second list of available channel pairs based on the channel pair energy measurements.

2. The apparatus of claim 1, the first device to communicate with a second device over the high rate physical channel, and the second device to communicate with the first device over the low rate physical channel.

3. The apparatus of claim 1, the first device to communicate with a second device over the high rate physical channel, and the second device to communicate with the first device over the low rate physical channel using code division multiple access.

4. The apparatus of claim 1, the channel selection module to compare energy measurements for the high rate physical channels for channel pairs from the first list with the high rate physical channel interference threshold value, generate the second list of channel pairs to comprise high rate physical channels with energy measurements below the high rate physical channel interference threshold value based on the comparison, compare energy measurements for the low rate physical channels for channel pairs from the second list with the low rate physical channel interference threshold value, and select the final channel pair from the second list having a low rate physical channel with a lowest energy measurement.

5. The apparatus of claim 1, the channel selection module to compare energy measurements for the low rate physical channels for channel pairs from the first list with the low rate physical channel interference threshold value, generate the second list of channel pairs to comprise low rate physical channels with energy measurements below the low rate physical channel interference threshold value based on the comparison, compare energy measurements for the high rate physical channels for channel pairs from the second list with the low rate physical channel interference threshold value, and select the final channel pair from the second list having a high rate physical channel with a lowest energy measurement.

6. The apparatus of claim 1, the channel selection module to generate the first list of available channel pairs each comprising a high rate physical channel and a low rate physical channel within a common frequency block.

7. The apparatus of claim 1, comprising:
a transmitter node; and
an antenna coupled to the transmitter node to support communication over the wireless communication link.

8. A method comprising:
performing energy measurements for available communication channels;
generating a first list of available channel pairs each comprising a high rate physical channel and a low rate physical channel;
calculating a weighted interference function for each channel pair in the first list of available channel pairs, the weighted interference function for each channel pair combining measured interferences of the high rate physical channel and the low rate physical channel of that channel pair to create a channel pair energy measurement for that channel pair that emphasizes or de-emphasizes the high rate physical channel or the low rate physical channel of that channel pair;
generating a second list of channel pairs based on the first list of available channel pairs and on one or both of a high rate physical channel interference threshold value and a low rate physical channel interference threshold value; and
selecting a final channel pair from the second list of available channel pairs based on the channel pair energy measurements.

9. The method of claim 8, comprising:
comparing energy measurements for the high rate physical channels for channel pairs from the first list with the high rate physical channel interference threshold value;
generating the second list of channel pairs to comprise high rate physical channels with energy measurements below the high rate physical channel interference threshold value based on the comparison;
comparing energy measurements for the low rate physical channels for channel pairs from the second list with the low rate physical channel interference threshold value; and
selecting the final channel pair from the second list having a low rate physical channel with a lowest energy measurement.

10. The method of claim 8, comprising:
comparing energy measurements for the low rate physical channels for channel pairs from the first list with the low rate physical channel interference threshold value;
generating the second list of channel pairs to comprise low rate physical channels with energy measurements below the low rate physical channel interference threshold value based on the comparison;

comparing energy measurements for the high rate physical channels for channel pairs from the second list with the low rate physical channel interference threshold value; and selecting the final channel pair from the second list having a high rate physical channel with a lowest energy measurement.

11. The method of claim 8, comprising communicating information over the low rate physical channel using code division multiple access.

12. The method of claim 8, comprising generating the first list of available channel pairs each comprising a high rate physical channel and a low rate physical channel within a common frequency sub-band.

13. An article comprising a non-transitory computer-readable storage medium containing instructions that if executed by a processor enable a system to:

perform energy measurements for available communication channels;

generate a first list of available channel pairs each comprising a high rate physical channel and a low rate physical channel;

calculate a weighted interference function for each channel pair in the first list of available channel pairs, the weighted interference function for each channel pair combining measured interferences of the high rate physical channel and the low rate physical channel of that channel pair to create a channel pair energy measurement for that channel pair that emphasizes or de-emphasizes the high rate physical channel or the low rate physical channel of that channel pair;

generate a second list of channel pairs based on the first list of available channel pairs and on one or both of a high rate physical channel interference threshold value and a low rate physical channel interference threshold value; and select a final channel pair from the second list of available channel pairs based on the channel pair energy measurements for a first communication device to communicate with a second communication device.

14. The article of claim 13, further comprising instructions that if executed enable a system to:

compare energy measurements for the high rate physical channels for channel pairs from the first list with the high rate physical channel interference threshold value;

generate the second list of channel pairs to comprise high rate physical channels with energy measurements below high rate physical channel interference threshold value based on the comparison;

compare energy measurements for the low rate physical channels for channel pairs from the second list with the low rate physical channel interference threshold value; and select the final channel pair from the second list having a low rate physical channel with a lowest energy measurement.

15. The article of claim 13, further comprising instructions that if executed enable a system to:

compare energy measurements for the low rate physical channels for channel pairs from the first list with the low rate physical channel interference threshold value;

generating the second list of channel pairs to comprise low rate physical channels with energy measurements below low rate physical channel interference threshold value based on the comparison;

comparing energy measurements for the high rate physical channels for channel pairs from the second list with the low rate physical channel interference threshold value; and selecting the final channel pair from the second list having a high rate physical channel with a lowest energy measurement.

16. The article of claim 13, further comprising instructions that if executed enable a system to communicate information over the low rate physical channel using code division multiple access.

* * * * *